US007992316B1

(12) United States Patent
Dickson

(10) Patent No.: US 7,992,316 B1
(45) Date of Patent: Aug. 9, 2011

(54) SYSTEM FOR MASKING TRIM AND LOCATING EDGE OF BULL-NOSE WALL CORNERS

(76) Inventor: Matthew T. Dickson, Aurora, CO (US)

( * ) Notice: Subject to any disclaimer, the term of this patent is extended or adjusted under 35 U.S.C. 154(b) by 0 days.

(21) Appl. No.: 12/584,746

(22) Filed: Sep. 11, 2009

(51) Int. Cl.
*G01B 3/14* (2006.01)

(52) U.S. Cl. ........................................ 33/562

(58) Field of Classification Search .................... 33/562, 33/194, 563, 565, 566
See application file for complete search history.

(56) References Cited

U.S. PATENT DOCUMENTS

| | | | | |
|---|---|---|---|---|
| 147,942 | A | 2/1874 | Hutchinson | |
| D33,546 | S | 11/1900 | Eggleston | |
| 1,192,910 | A | 8/1916 | Lawrence | |
| 1,843,432 | A | 11/1932 | Nickerson | |
| 2,045,597 | A | 6/1936 | Haug | |
| 2,210,233 | A | 8/1940 | De Lillo | |
| 2,509,164 | A * | 5/1950 | Nath | 33/41.1 |
| 2,574,152 | A | 11/1951 | Lewis et al. | |
| 2,805,485 | A * | 9/1957 | Krummel | 33/563 |
| 3,693,589 | A | 9/1972 | Knox | |
| 3,752,304 | A | 8/1973 | Alef | |
| 4,263,355 | A | 4/1981 | Sarkisian | |
| 4,420,520 | A | 12/1983 | Jones et al. | |
| 4,430,137 | A | 2/1984 | Jones | |
| 4,524,522 | A | 6/1985 | Perry | |
| 4,789,579 | A | 12/1988 | Tutas et al. | |
| 5,631,055 | A | 5/1997 | Vines et al. | |
| D384,297 | S | 9/1997 | Paynes | |
| 5,706,586 | A * | 1/1998 | Payne | 33/563 |
| 5,749,154 | A * | 5/1998 | Scharf | 33/563 |
| 5,922,157 | A * | 7/1999 | Snider | 156/71 |
| 6,421,860 | B1 | 7/2002 | Abbott | |
| 6,499,223 | B2 * | 12/2002 | Momosaki | 33/562 |
| 6,579,587 | B2 | 6/2003 | Schnoebelen, Jr. | |
| 6,627,259 | B1 | 9/2003 | Jevons | |
| 7,055,259 | B2 * | 6/2006 | Goldman | 33/562 |
| 7,174,653 | B2 * | 2/2007 | Mansfield | 33/563 |
| 2002/0100180 | A1 * | 8/2002 | Montefusco | 33/563 |

* cited by examiner

*Primary Examiner* — Christopher W Fulton
(74) *Attorney, Agent, or Firm* — Ramon L. Pizarro; Edwin H. Crabtree

(57) ABSTRACT

A system for locating the midpoint of an arc of a bull-nose while masking surfaces adjacent to the bull-nose corner between a pair of flat walls is disclosed. One example of the system uses a flexible planar sheet that has a lower surface having a low-tack adhesive and includes a semicircular edge that is used to mask trim next to the bull-nose corner. Another example uses a tool that includes a semicircular edge that commences tangentially from a straight edge and includes indicia along the concave arc. The arc portion of the shape is positioned against the bull-nose while the straight edge portion the shape is positioned against one of the planar walls so that the midpoint of the arc may be read from the indicia along the concave arc.

13 Claims, 6 Drawing Sheets

SYSTEM FOR MASKING TRIM AND LOCATING EDGE OF BULL-NOSE WALL CORNERS

BACKGROUND OF THE INVENTION (a) Field of the Invention

This application relates to a system for determining the boundary or "edge" of walls that meet at a rounded corner. More particularly, but not by way of limitation, this application is directed to a device and method for assisting in the painting of walls by establishing the boundary edge and masking the trim pieces that are found at the base of the wall and the ceiling.

(b) Discussion of Known Art

The use of masking tape for protecting the trim pieces at the upper and lower boundaries of the walls in a building, such as a house, is well known. Masking tape is commonly sold in rolls of various widths. A problem associated with using masking material that is sold in rolls is that the rolls will necessarily include straight edges, which makes it difficult for the user to use the tape to follow a rounded corner. To mask the trim pieces of rounded corners, the user typically has to break short sections of tape and apply these to the trim. The problem with this approach is that by using several sections of tape the user creates a mask with many joints, each joint providing an opportunity for seepage of paint onto the trim.

In addition to creating opportunities for seepage of paint, the use of several sections of making tape to round a corner of trim can also be time consuming and frustrating. Masking tape does not always break off in the manner or location needed, and thus often leads to waste of masking tape and time, due to repeated attempts at creating a correctly shaped piece.

There are known devices for masking corners. An example of such a device is taught in U.S. Pat. No. 6,579,587 to Schnoebelen, Jr., and which is incorporated herein in its entirety by reference. While the Schnoebelen is a good approach at masking wall corners formed by walls that are at 90 degrees to one another, it does not take into account the fact that as-built walls are rarely as-drawn or as-designed, and thus walls that are truly at 90 degrees to one another represent ideal conditions, and not the more common as-built condition. The dimensional tolerances for most internal components of buildings are flexible enough such that what is actually built (the as "built" structure and its components) is rarely exactly what is shown in the construction drawings. Thus a pair of walls that have been shown in the blueprints as being at 90 degrees to one another may actually be built at 85 degrees, without being out of specification. Thus, a masking device that is made at 90 degrees is likely to not fit properly.

Still further, bull-nose corners are commonly shaped by attaching a bull-nose corner piece that is made from an extruded plastic or thin metal, which is then attached to the walls near the line of intersection of the planes of each wall. The flexibility of the corner piece further accommodates imperfections in the angular relationship of the two wall sections, but further complicates the location of the line where each side of the wall begins. Problems arising from these imperfections are often obviated in new construction by painting all walls the same color. Homeowners who later wish to paint the walls of connecting rooms in different colors are then faced with the problem of locating the midpoint of the arc of the bull-nose and masking the trim at the ends of the bull-nose corner.

Accordingly, there remains a need for a system that aids a person in finding the midpoint of the arc of a bull-nose corner between a pair of walls. Still further, there remains a need for a system that allows a person to use pre-shaped sections to mask trim or surfaces that are adjacent to bull-nose corners.

SUMMARY

It has been discovered that the problems left unanswered by known art can be solved by providing a system for locating the midpoint of an arc of a bull-nose while masking surfaces adjacent to the bull-nose corner between a pair of flat walls, the system includes:

a flexible planar sheet of material that is made from an upper layer and a peel-away lower layer, the upper layer having an upper layer upper surface and an upper layer lower surface, the upper layer lower surface having a low-tack adhesive is protected by the lower layer that covers the lower surface of the upper layer;

the flexible planar sheet having a plurality of shapes scored through the upper layer but not through the lower layer, each shape having at least one semicircular edge creating a concave arc into the shape, the semicircular edge commencing tangentially from a straight edge in the upper layer, the upper surface of the upper layer of the concave shape may include indicia along the concave arc, the indicia being angular graduations along the concave arc, so that when the arc portion of the shape is positioned against the bull-nose while the straight edge portion the shape is positioned against one of the planar walls the midpoint of the arc may be read from the indicia along the concave arc, and the lower surface is adhered to the surface adjacent to the bull nose.

It is contemplated that the disclosed invention may include shapes that have the tangential straight edge on one end of the arc, while the other shapes will have the tangential straight edge on the opposite end of the arc, and thus the shapes may be said to be "handed" in that on one type of shape the straight edge extends from the right end of the arc, while on another type of shape the straight edge extends from the left end of the arc. Placing a right handed shape over a left handed shape allows for quick location of the midpoint of the arc, by reducing the locus of the location of the midpoint of the arc to the overlapping area.

Still further, it is contemplated that the disclosed system may also be used with a rigid tool that includes an arc and a straight edge that is tangential to the arc. The rigid tool may be used with one of the shapes to locate the midpoint of the arc in the same manner as shapes of different hands may be used to rapidly locate the center of an arc.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which.

DETAILED DESCRIPTION OF PREFERRED EXEMPLAR EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 1:
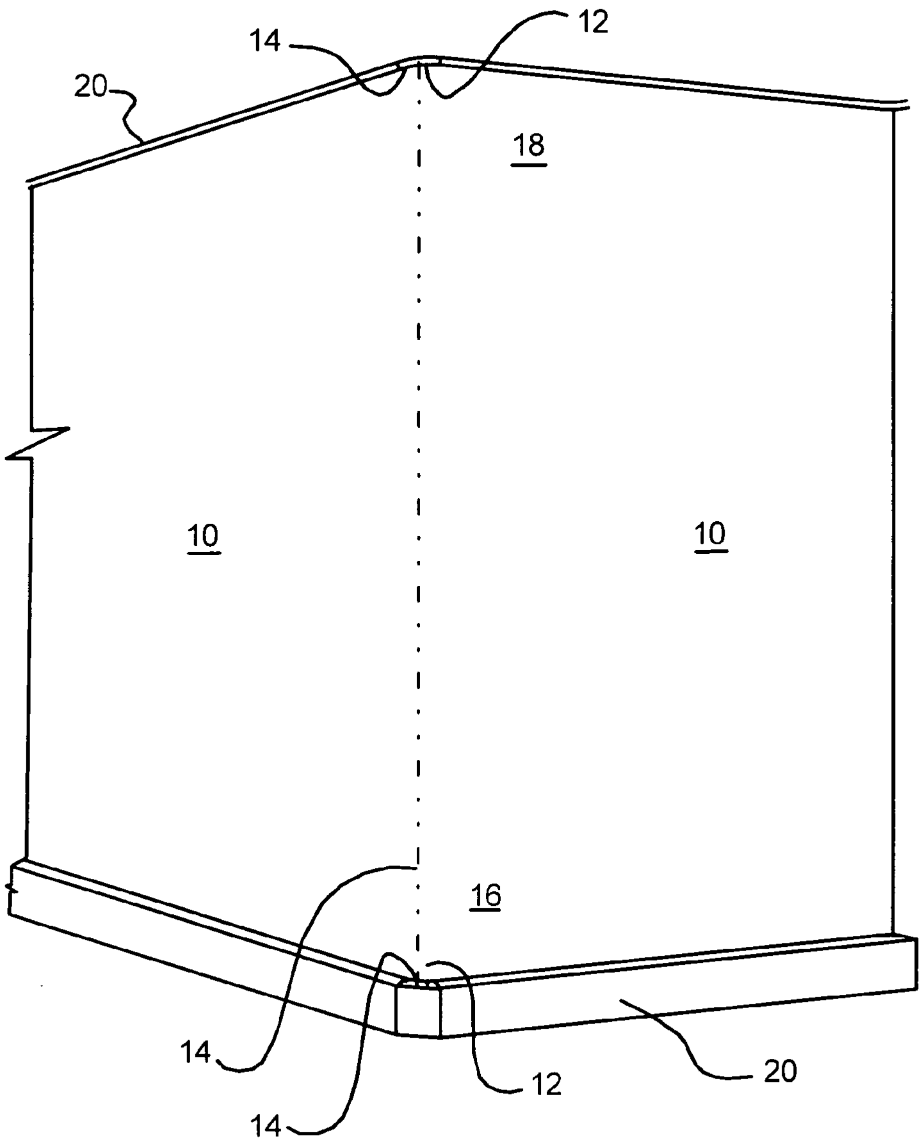
FIG. 1 is a perspective view of a corner between a pair of walls, showing an embodiment of the invention while in use.
Figure 2:
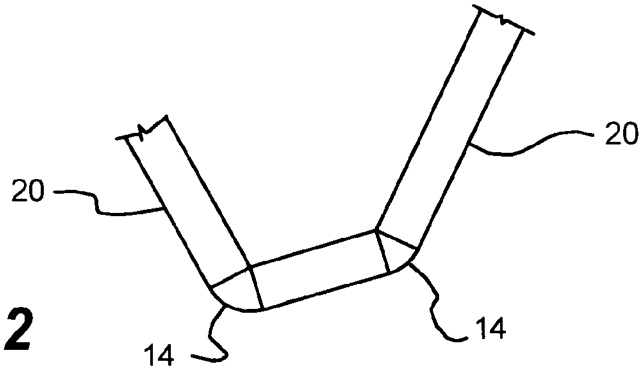
FIG. 2 is a schematic showing angled walls with bull-nose external corners between them.

Turning now to FIG. 1, the reader will observe the intersection of a pair of planar walls 10 with a bull-nose 12 corner at their intersection has been illustrated. The walls 10 are illustrated at an arbitrary angle to one another, but it is likely that the disclosed system will be used on walls that intersect at about 90 degrees to another, for this is perhaps the most common in current construction. The walls are referred to as being at about 90 degrees due to the fact that walls that are designed as being at 90 degrees are likely to be built at about 90 degrees, and not exactly at 90 degrees. Accordingly, arc length of the as-built bull-nose 12 will be some random length. Thus, if one wants to ensure that the bull-nose 12 is evenly divided when painting each wall a different color, one must first ascertain the true arc-length of the as-built bull-nose, and then divide this measurement by two in order to locate the midpoint 14 of the arc of bull-nose.

The midpoint of the arc of the bull-nose would be established near a lower plane 16 and near an upper plane 18, and then a line connecting the two midpoints 14 would be used as the boundary between the two walls 10. The boundary line does not have to be an actual line, as drawn with a pencil or pen, but preferably would be a boundary line established by a section of masking tape with the edge of each end at while masking surfaces adjacent to the midpoints of the bull-nose near the lower plane 14 and the upper plane 16.

Figure 3:
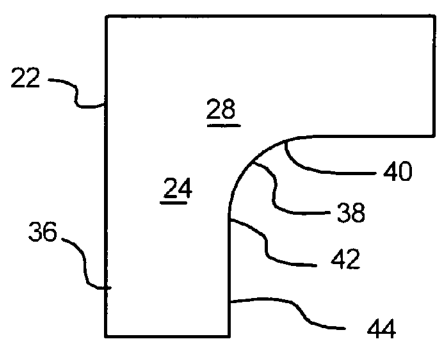
FIG. 3 illustrates one example of the disclosed pre-cut masking device made from a flexible planar sheet of material.
Figure 3A:
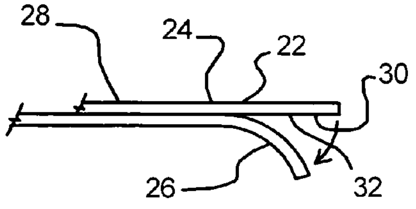
FIG. 3A illustrates the peel-away arrangement of the example shown on FIG. 3.
Figure 3B:
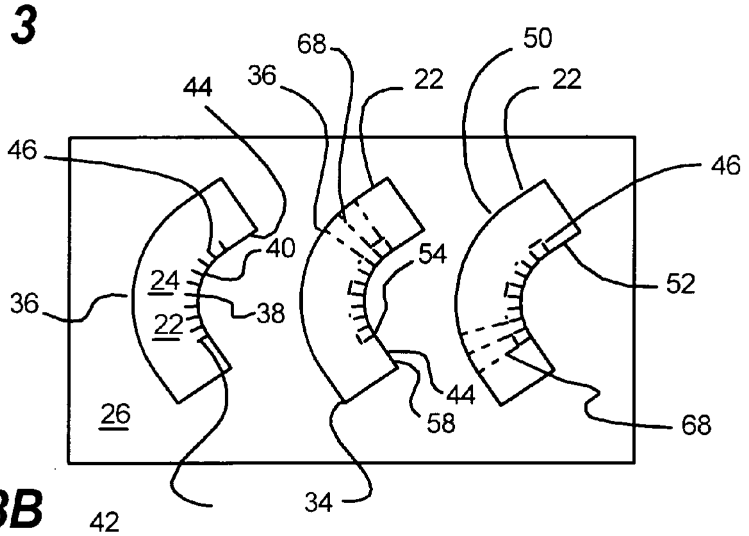
FIG. 3B illustrates variations of example shown on FIG. 3, with graduations for identifying the center of a rounded, bull-nose corner.

Because the disclosed system is also used to mask the trim 20 that is usually found between the lower plane 16, or the floor of the room, and the wall 10, it is preferred that the system be made from a flexible planar sheet of material 22, as illustrated in FIGS. 3, 3A, 3B and 4. FIG. 3AS illustrates that it is preferred that the flexible planar sheet of material will be made from an upper layer 24 and a peel-away lower layer 26. The upper layer 24 will include an upper layer upper surface 28 and an upper layer lower surface 30. The upper layer lower surface 30 will include a low-tack adhesive 32 is protected by the peel-away lower layer 26. It is contemplated that the disclosed invention may be made without using the peel-away lower layer 26, with separation of the layers being accomplished by the use of the low-tack adhesive 32 between the layers.

Figure 4:
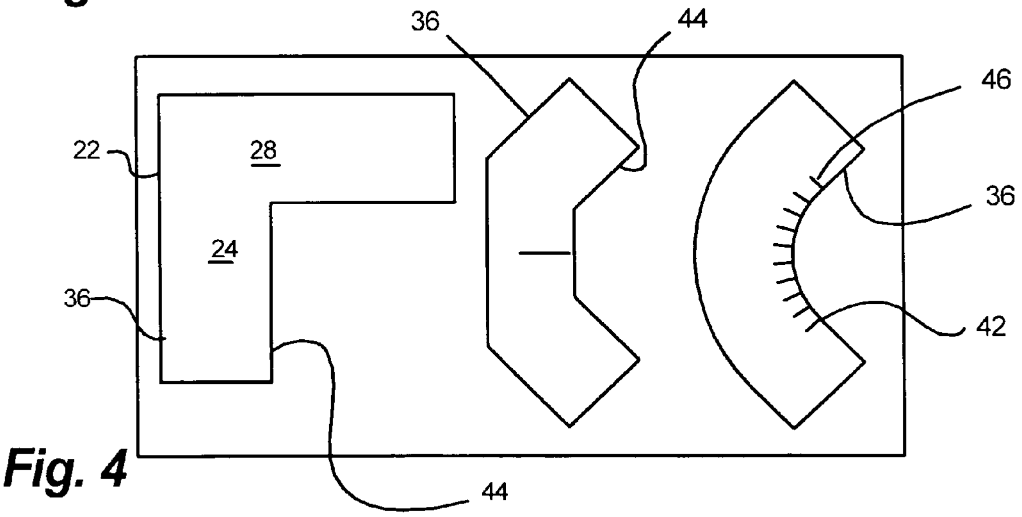
FIG. 4 illustrates one example of the disclosed invention, with angular outer edges.
Figure 5:
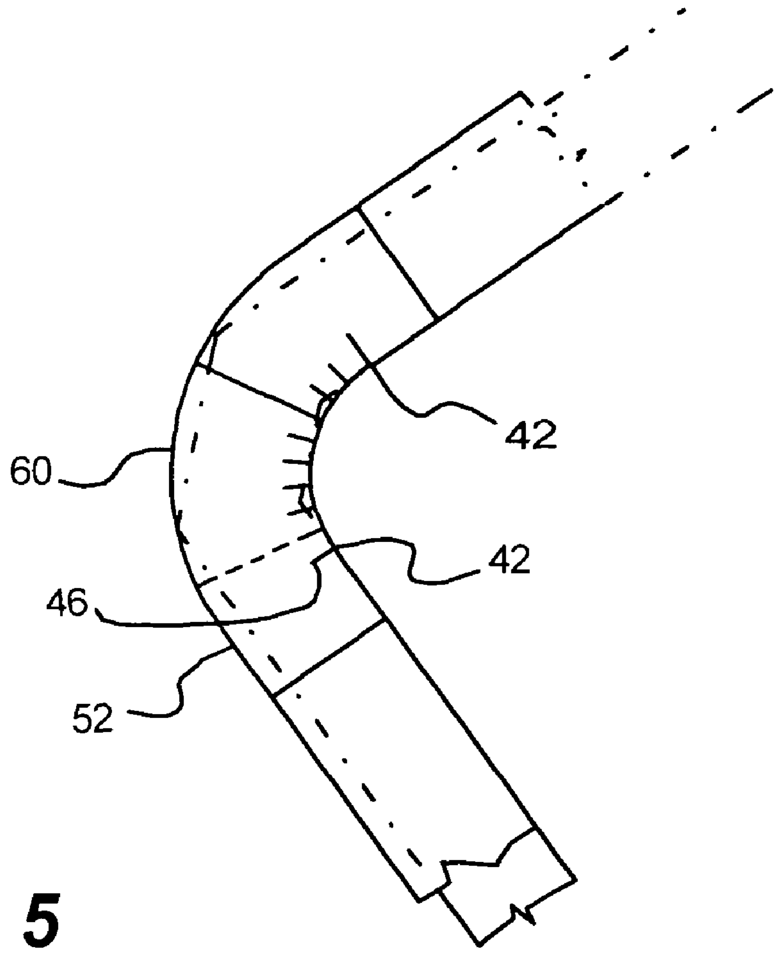
FIG. 5 illustrates the use of an example of the disclosed system.
Figure 6:
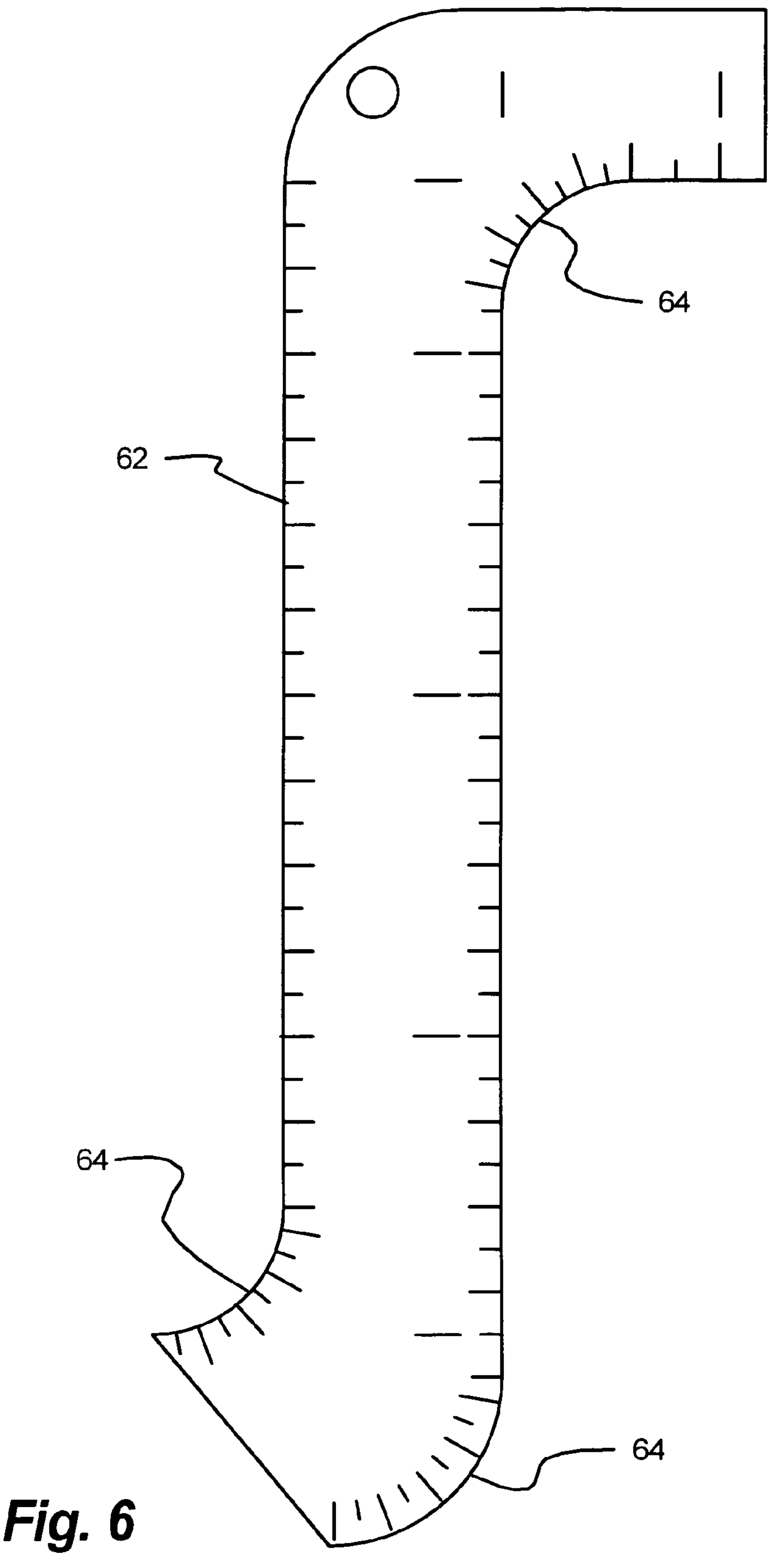
FIG. 6 illustrates a tool for using concepts taught herein.
Figure 7:
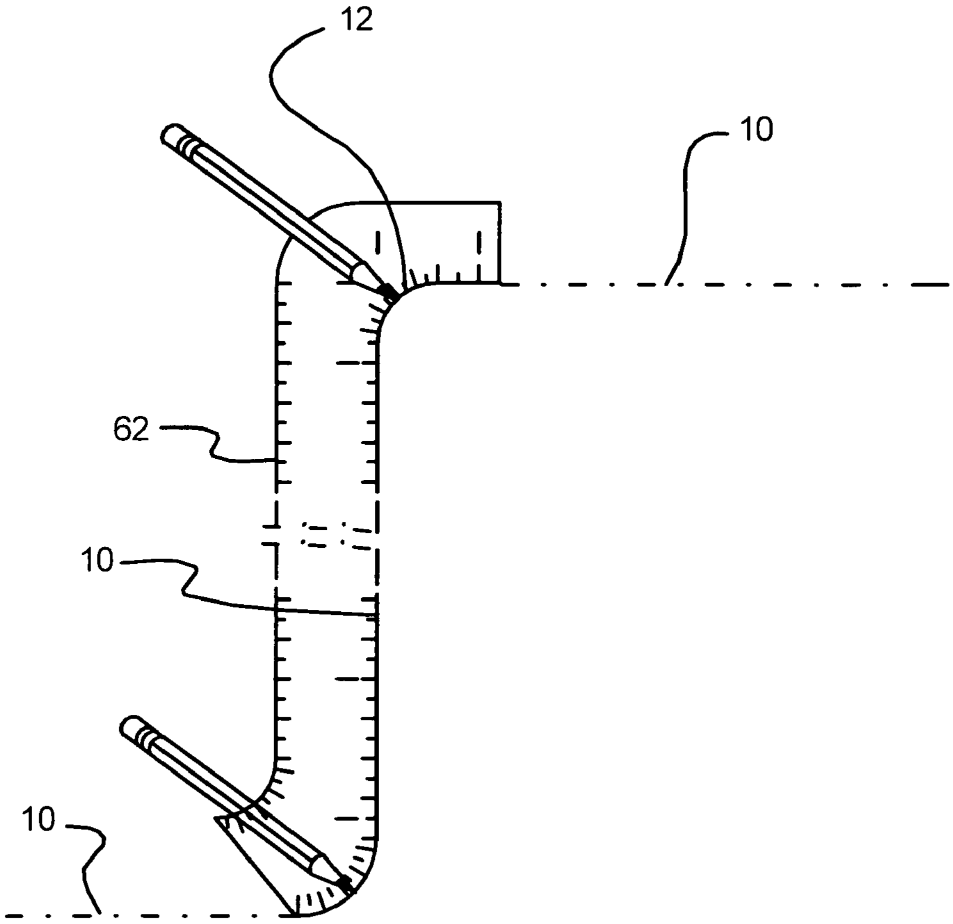
FIG. 7 illustrates the tool illustrated in FIG. 6 while in use.
Figure 8:
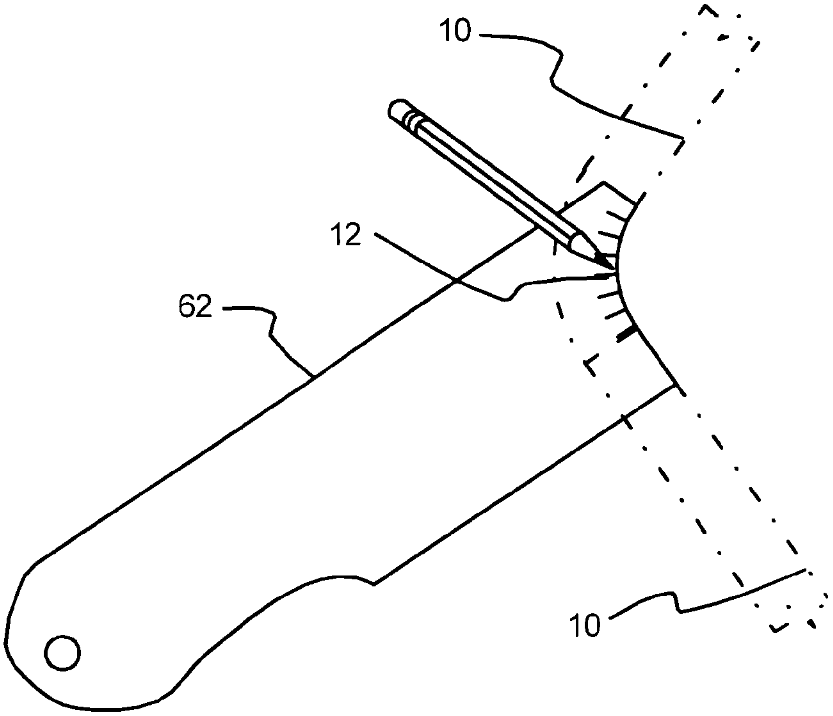
FIG. 8 illustrates a variation of a tool that uses inventive concepts taught herein.

Scored into the flexible planar sheet 22 will be a plurality of shapes 34. The shapes will be scored through the upper layer 24 but not through the lower layer 26. Also, it is contemplated that each shape 34 will include a perimeter 36 that encloses and thus defines the entire shape 34. FIGS. 3 and 4, illustrate that the perimeter 36 includes at least one semicircular edge 38 that is a concave arc 40 that extends less than about 90 degrees from the starting point 42 of the concave arc 40. The starting point 42 of the semicircular edge 38 is also the tangent point connecting a straight edge 44 in the shape 34 scored into the upper layer 24.

The enclosed FIGS. 3, 3A, 3B and 4-5 also show that shape 34 will also include indicia 46 along the concave arc 40. It is preferred that the indicia being angular graduations on the upper layer upper surface 28 along the concave arc 40, commencing from the starting point 42. The graduations may be in degrees, radians, or simply fractions of the entire concave arc 40. This arrangement will allow the arc portion 40 of the shape 34 is positioned against the bull-nose 12 while the straight edge portion 44 the shape 34 is positioned against one of the planar walls 10 the midpoint 14 of the arc 40 may be determined using the indicia 46 along the concave arc 40, while the lower surface 30 is adhered to the surface adjacent to the bull-nose, which may be a floor, a ceiling, the top of the trim, or any other similar surface on a lower plane 16 or upper plane 18.

Referring now to FIG. 4, it will be understood that it is contemplated that the shapes 34 may be configured such that one has the tangential straight edge 44 on the right end 50 of the arc 40 to create a right handed shape 52. Additionally, at least one of the shapes 34 will have the tangential straight edge 44 on the left end 54 of the arc 40 to create a left handed shape 58. It will be understood from FIG. 5 that by providing handed shapes allows the user to place the right handed shape 52 over the left handed shape 58 with the straight edge 44 of the right handed shape 52 and the straight edge 44 of the left handed shape 58 to produce an overlapping area 60, which will encompass the location of the midpoint 14 of the arc and the midpoint of the bull-nose 12. In order to facilitate the location of the midpoint 14 within the overlapping area 60, it is contemplated that the at least a part of the shape 58 be made of a translucent or transparent material that will allow the user to see the graduations on the lower shape, and thus further facilitate the location of the midpoint 14.

Turning now to FIGS. 6-9 it will be understood that it is contemplated that the disclosed invention may also be used with a hand tool 62 that includes a tool arc 64 that is concave and a tool straight edge 66 that is tangential to the tool arc, so that the tool cooperates with the shapes to locate the midpoint of the arc and the straight edge of the left handed shape to produce an overlapping area, thereby focusing on the location of the midpoint of the bull-nose to the overlapping area. It is contemplated that the hand tool 62 may be made of a translucent or transparent material that allows the user to use the hand tool 62 over one of the shapes 52 to locate the midpoint 14. This may be particularly helpful in situations where the walls are at angles that are significantly more than 90 degrees, and thus resulting in a shorter arc or bull-nose.

Figure 9:
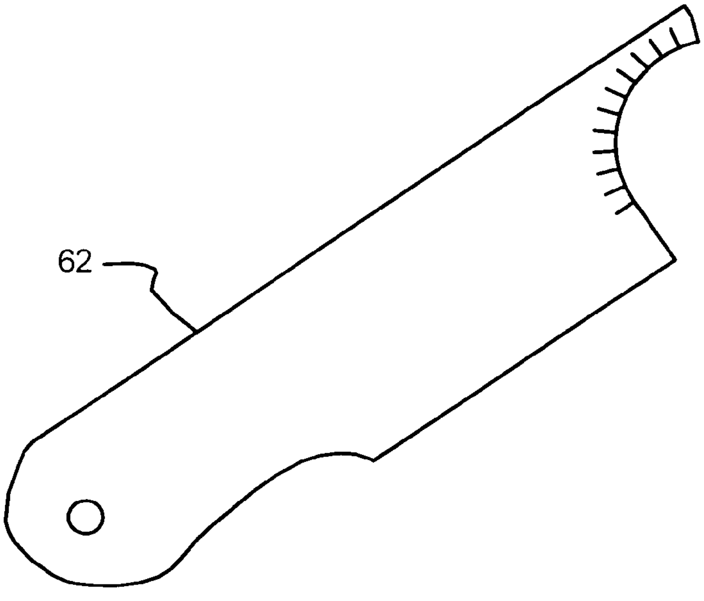
FIG. 9 illustrates the tool illustrated in FIG. 8 while in use.

For situations where the walls are at angles that are significantly different than 90 degrees, for example where the angle from wall to wall is 245 degrees, it is contemplated that the shapes 52 would include weakened areas 68 at locations along the arc shapes to facilitate removing sections of the arc 40, thereby reducing the length of the arc. These situations would also benefit from the use of "handed" shapes, as described above, and would also benefit from the use of translucent or transparent materials as part of the shapes 52 or the hand tool 62. Clearly, the length of the arc in a hand tool 62 may be shortened in order to accommodate situations where the angle from wall to wall is less than 270 degrees, such as the example described above, and as shown in FIG. 8. A tool that accommodates situations where the angle from wall to wall is more than 270 degrees is shown in FIG. 9.

Thus it can be appreciated that the above-described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. A system for locating the midpoint of an arc of a bull-nose while masking surfaces adjacent to the bull-nose corner between a pair of flat walls, the system includes:

a flexible planar sheet of material that is made from an upper layer and a peel-away lower layer, the upper layer having an upper layer upper surface and an upper layer lower surface, the upper layer lower surface having a low-tack adhesive is protected by the lower layer that covers the lower surface of the upper layer;

the flexible planar sheet having a plurality of shapes scored through the upper layer but not through the lower layer, each shape having a perimeter that encloses the entire shape, the perimeter including at least one semicircular edge creating a concave arc into the shape, the semicircular edge commencing tangentially from a straight edge in the upper layer, so that when the arc of the shape is positioned against the bull-nose while the straight edge portion the shape is positioned against one of the planar walls the lower surface is adhered to the surface adjacent to the bull-nose; and a hand tool comprising a tool arc that is concave and a tool straight edge that is tangential to the tool arc, so that the hand tool cooperates with the shapes to locate the midpoint of the arc and the straight edge of the left handed shape to produce an overlapping area, thereby focusing the location of the midpoint of the bull-nose to the overlapping area.

2. A system according to claim 1 wherein the upper surface of the upper layer of the concave shape having indicia along the concave arc, the indicia signifying angular graduations along the concave arc.

3. A system according to claim 1 wherein at least one of said shapes has the tangential straight edge on the right end of the arc to create a right handed shape, and at least one of the shapes has the tangential straight edge on the left end of the arc to create a left handed shape, so that placing the right handed shape over the left handed shape with the straight edge of the right handed shape and the straight edge of the left handed shape to produce an overlapping area, thereby focusing the location of the midpoint of the bull-nose to the overlapping area.

4. A system according to claim 1 wherein the tool concave arc is in a section of translucent material with angular graduations.

5. A system according to claim 4 wherein each of the shapes includes weakened areas along the arc.

6. A system according to claim 5 wherein the arc of each of the shapes is equal to or less than about 90 degrees.

7. A system for locating the midpoint of an arc of a bull-nose while masking surfaces adjacent to the bull-nose corner between a pair of flat walls, the system includes:

a flexible planar sheet of material that is made from an upper layer and a peel-away lower layer, the upper layer having an upper layer upper surface and an upper layer lower surface, the upper layer lower surface having a low-tack adhesive is protected by the lower layer that covers the lower surface of the upper layer;

the flexible planar sheet having a plurality of shapes scored through the upper layer but not through the lower layer, each shape having a perimeter that encloses the entire shape, the perimeter including at least one semicircular edge that is a concave arc that extends less than about 90 degrees, the semicircular edge commencing tangentially from a straight edge in the upper layer, the upper surface of the upper layer of the concave shape having indicia along the concave arc, the indicia being angular graduations along the concave arc and on the upper layer upper surface, so that when the arc portion of the shape is positioned against the bull-nose while the straight edge portion the shape is positioned against one of the planar walls the midpoint of the arc may be read from the indicia along the concave arc, and the lower surface is adhered to the surface adjacent to the bull-nose; and a hand tool comprising a tool arc that is concave and a tool straight edge that is tangential to the tool arc, so that the tool cooperates with the shapes to locate the midpoint of the arc and the straight edge of the left handed shape to produce an overlapping area, thereby focusing the location of the midpoint of the bull-nose to the overlapping area.

8. A system according to claim 7 wherein at least one of said shapes has the tangential straight edge on the right end of the arc to create a right handed shape, and at least one of the shapes has the tangential straight edge on the left end of the arc to create a left handed shape, so that placing the right handed shape over the left handed shape with the straight edge of the right handed shape and the straight edge of the left handed shape to produce an overlapping area, thereby focusing the location of the midpoint of the bull-nose to the overlapping area.

9. A system according to claim 8 wherein each of the shapes includes weakened areas along the arc.

10. A system according to claim 9 wherein the arc of each of the shapes is equal to or less than about 90 degrees.

11. A system according to claim 9 wherein the shapes are made of a material that is at least translucent.

12. A method for locating the midpoint of an arc of a bull-nose while masking surfaces adjacent to the bull-nose corner between a pair of flat walls, and between an upper plane and a lower plane, the method comprising:

providing a flexible planar sheet of material that is made from an upper layer and a peel-away lower layer, the upper layer having an upper layer upper surface and an upper layer lower surface, the upper layer lower surface having a low-tack adhesive is protected by the lower layer that covers the lower surface of the upper layer, the flexible planar sheet having a plurality of shapes scored through the upper layer but not through the lower layer, each shape having a perimeter that encloses the entire shape, the perimeter including at least one semicircular edge that is a concave arc that extends less than about 90 degrees, the semicircular edge commencing tangentially from a straight edge in the upper layer, the upper surface of the upper layer of the concave shape having indicia along the concave arc, the indicia being angular graduations along the concave arc and on the upper layer upper surface;

separating at least one of the shapes from the lower layer to expose the low-tack adhesive on the lower surface of the upper layer;

placing the arc portion of the shape against the bull-nose while the straight edge portion the shape is positioned against one of the planar walls, and then placing the adhesive against the lower plane, and determining the midpoint of the arc by counting the number of graduations along the bull-nose and then dividing the number of graduations by two to find the location of the midpoint along the indicia; and providing a hand tool comprising a tool arc that is concave and a tool straight edge that is tangential to the tool arc, so that the tool cooperates with the shapes to locate the midpoint of the arc and the straight edge of the left handed shape to produce an overlapping area; and then determining the location of the midpoint of the bull-nose by placing the concave portion of the hand tool over the bull-nose with the straight edge portion of the hand tool against one of the walls and then determining the location of the midpoint of the bull-nose by diving the graduations of the overlapping area by two.

13. A method according to claim 12 wherein the shapes are made of a material that is at least translucent.

* * * * *